(12) United States Patent
Siddens (10) Patent No.: US 10,399,798 B1
(45) Date of Patent: Sep. 3, 2019

(54) AIRLOCK FEEDER SYSTEM

(71) Applicant: Montrey A. Siddens, New Port Richey, FL (US)

(72) Inventor: Montrey A. Siddens, New Port Richey, FL (US)

(*) Notice: Subject to any disclaimer, the term of this patent is extended or adjusted under 35 U.S.C. 154(b) by 54 days.

(21) Appl. No.: 14/040,845

(22) Filed: Sep. 30, 2013

Related U.S. Application Data (60) Provisional application No. 61/764,390, filed on Feb. 13, 2013.

(51) Int. Cl.
*B65G 53/40* (2006.01)

(52) U.S. Cl.
CPC .................... *B65G 53/40* (2013.01)

(58) Field of Classification Search
CPC ...................................... B65G 53/40
USPC ........... 406/74, 129, 182; 222/636; 137/258
See application file for complete search history.

(56) References Cited

U.S. PATENT DOCUMENTS

| | | | | |
|---|---|---|---|---|
| 2,675,885 | A * | 4/1954 | Fox ...................... | A61M 16/104 128/205.28 |
| 4,163,582 | A * | 8/1979 | Voss ...................... | B65G 53/46 406/12 |
| 4,516,888 | A * | 5/1985 | Kardinal ................ | B65G 51/34 406/182 |
| 4,536,121 | A * | 8/1985 | Stewart .............. | B65G 53/4641 222/270 |
| 4,751,948 | A * | 6/1988 | Hertig ...................... | B65B 1/36 128/203.15 |
| 6,516,810 | B1 * | 2/2003 | Haul ...................... | B65G 51/02 131/108 |
| 7,226,248 | B2 * | 6/2007 | Hafner ................ | B65G 53/4616 222/636 |

* cited by examiner

*Primary Examiner* — Jospeh A Dillon, Jr.

(57) ABSTRACT

An input assembly, adapted to receive a quantity of material to be fed, includes a single input opening above and first and second spaced outlet openings below. An output assembly is operatively coupled to and fixedly positioned beneath the input assembly and is adapted to receive material from the input assembly for feeding through dual discharge tubes. A reciprocating assembly, located between the input and output assemblies, includes first and second chambers. A drive mechanism is adapted to reciprocate the chambers between a first orientation where the first chamber is being filled while the second chamber is being discharged and a second orientation where the second chamber is being filled while the first chamber is being discharged.

4 Claims, 6 Drawing Sheets

AIRLOCK FEEDER SYSTEM

RELATED APPLICATION

The present application is based upon Provisional Application Ser. No. 61/764,390 filed Mar. 13, 2013, the subject matter of which is incorporated herein by reference.

BACKGROUND OF THE INVENTION

Field of the Invention

The present invention relates to an airlock feeder system and more particularly pertains to conveying dry particulate flour material from a single input position to two separate destinations simultaneously, the conveying being done in a safe, time-efficient, continuous and economical manner.

SUMMARY OF THE INVENTION

In view of the foregoing disadvantages inherent in the known types of feeder systems now present in the prior art, the present invention provides an improved airlock feeder system. As such, the general purpose of the present invention, which will be described subsequently in greater detail, is to provide a new and improved airlock feeder system and method which has all the advantages of the prior art and none of the disadvantages.

To attain this, the present invention essentially comprises an input assembly. An input assembly, adapted to receive a quantity of material to be fed, includes a single input opening above and first and second spaced outlet openings below. An output assembly is operatively coupled to and fixedly positioned beneath the input assembly and is adapted to receive material from the input assembly for feeding through dual discharge tubes. A reciprocating assembly, located between the input and output assemblies, includes first and second chambers. A drive mechanism is adapted to reciprocate the chambers between a first orientation where the first chamber is being filled while the second chamber is being discharged and a second orientation where the second chamber is being filled while the first chamber is being discharged.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved airlock feeder system which has all of the advantages of the prior art feeder systems and none of the disadvantages.

It is another object of the present invention to provide a new and improved airlock feeder system which may be easily and efficiently manufactured and marketed.

It is further object of the present invention to provide a new and improved airlock feeder system which is of durable and reliable constructions.

An even further object of the present invention is to provide a new and improved airlock feeder system which is susceptible of a low cost of manufacture with regard to both materials and labor, and which accordingly is then susceptible of low prices of sale to the consuming public, thereby making such airlock feeder system economically available to the buying public.

Lastly, another object of the present invention is to provide an airlock feeder system for conveying dry particulate flour material from a single input position to two separate destinations simultaneously, the conveying being done in a safe, time-efficient, continuous and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
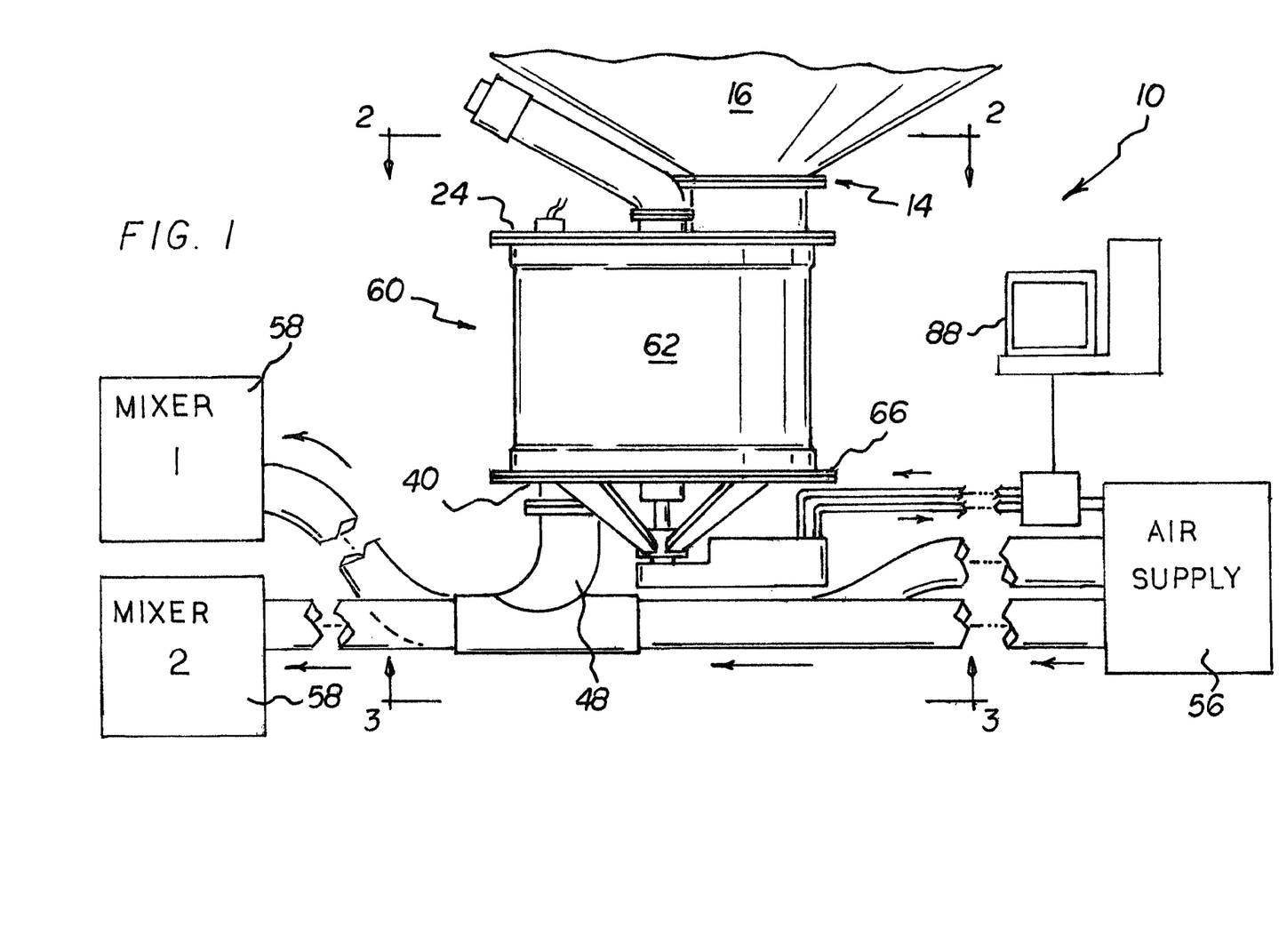
FIG. 1 is a side elevational view of an airlock feeder system constructed in accordance with the principles of the present invention.
Figure 2:
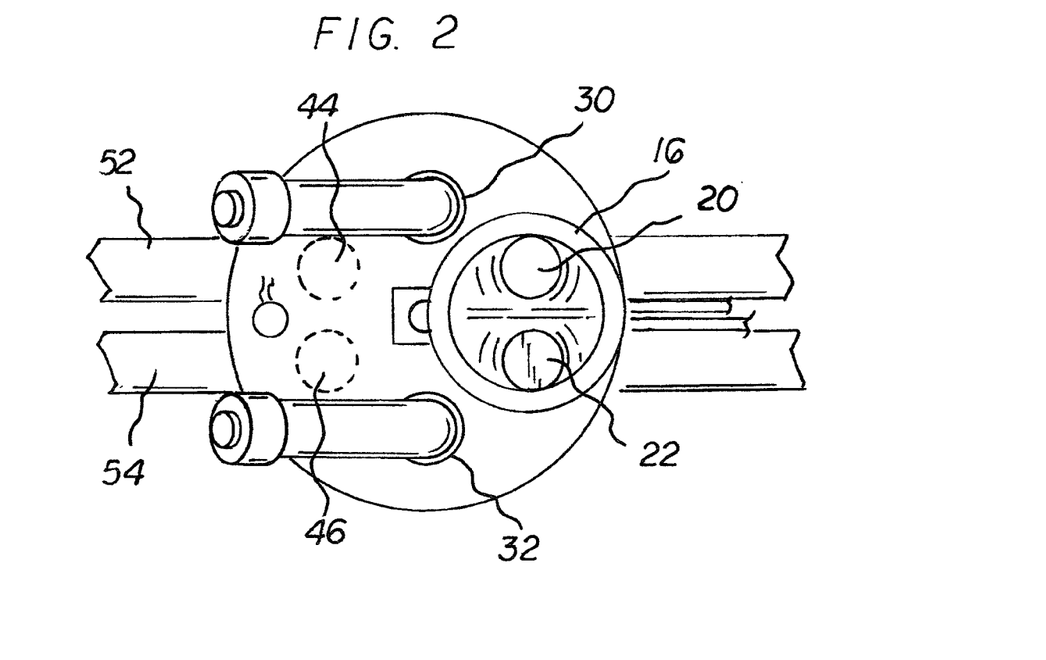
FIGS. 2 and 3 are cross sectional views taken along lines 2-2 and 3-3 of FIG. 1.
Figure 3:
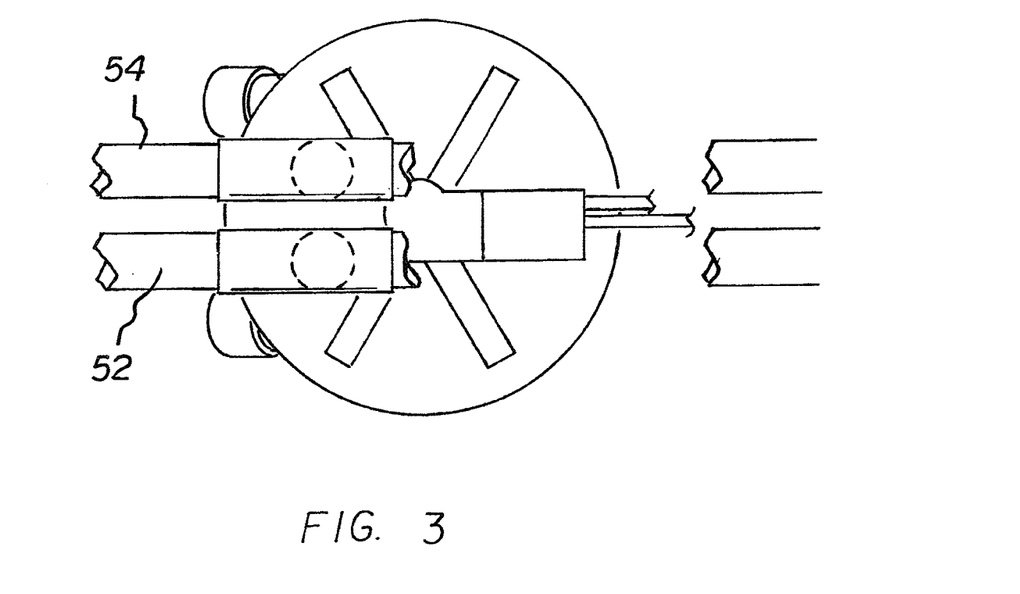
Figure 4:
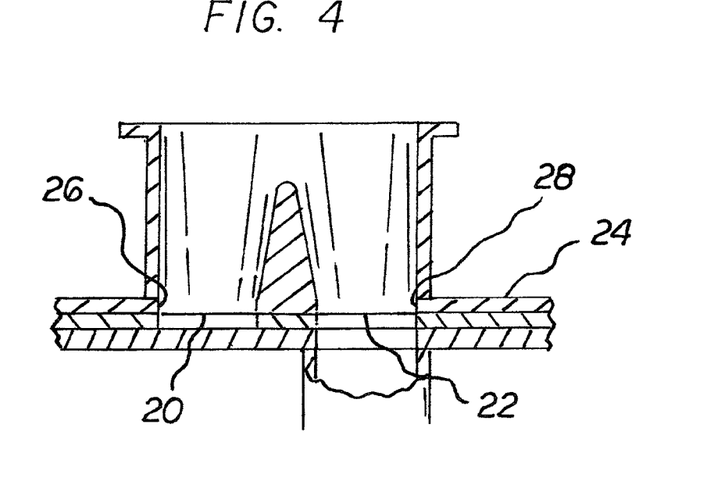
FIG. 4 is a cross sectional view taken through the input assembly and a portion of the reciprocating assembly.
Figure 5:
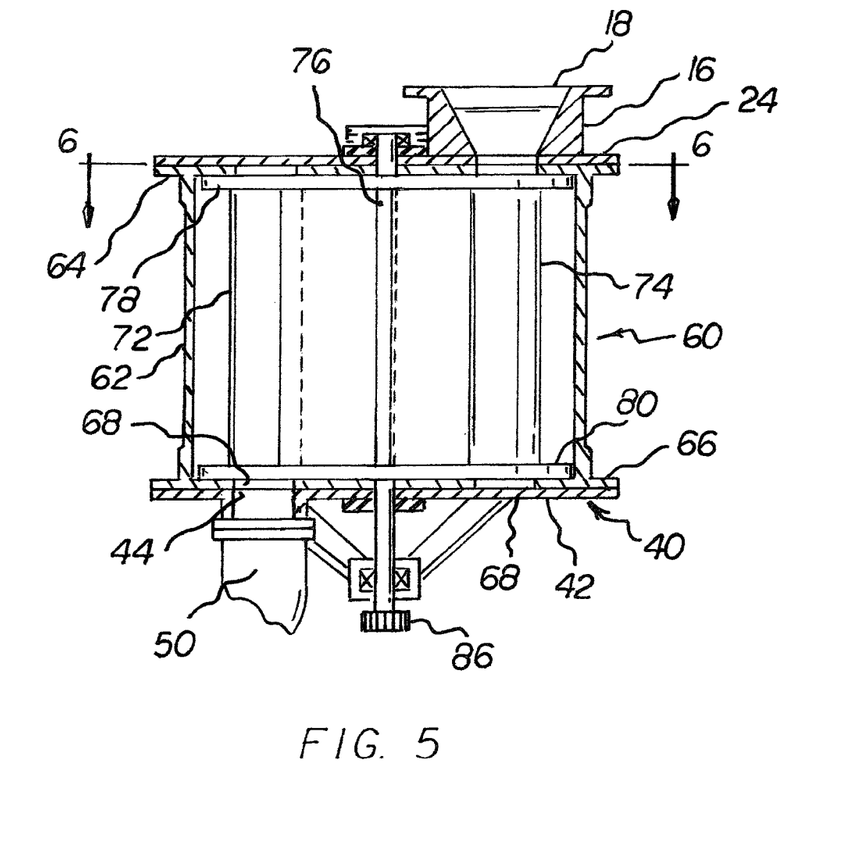
FIG. 5 is a cross sectional view taken through the reciprocating assembly and the interface regions adjacent to the input and output assemblies.
Figure 6:
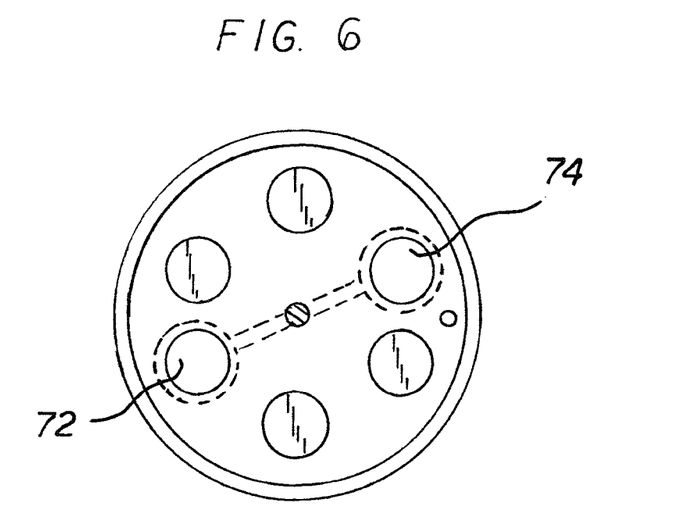
FIGS. 6 and 7 are cross sectional views taken along line 6-6 of FIG. 5 showing the reciprocating assembly in alternate orientations.
Figure 7:
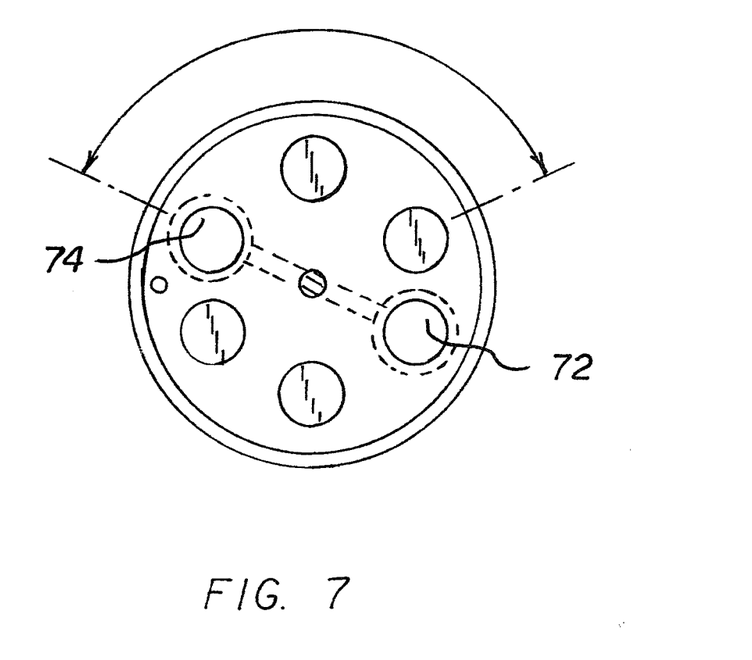
Figure 8:
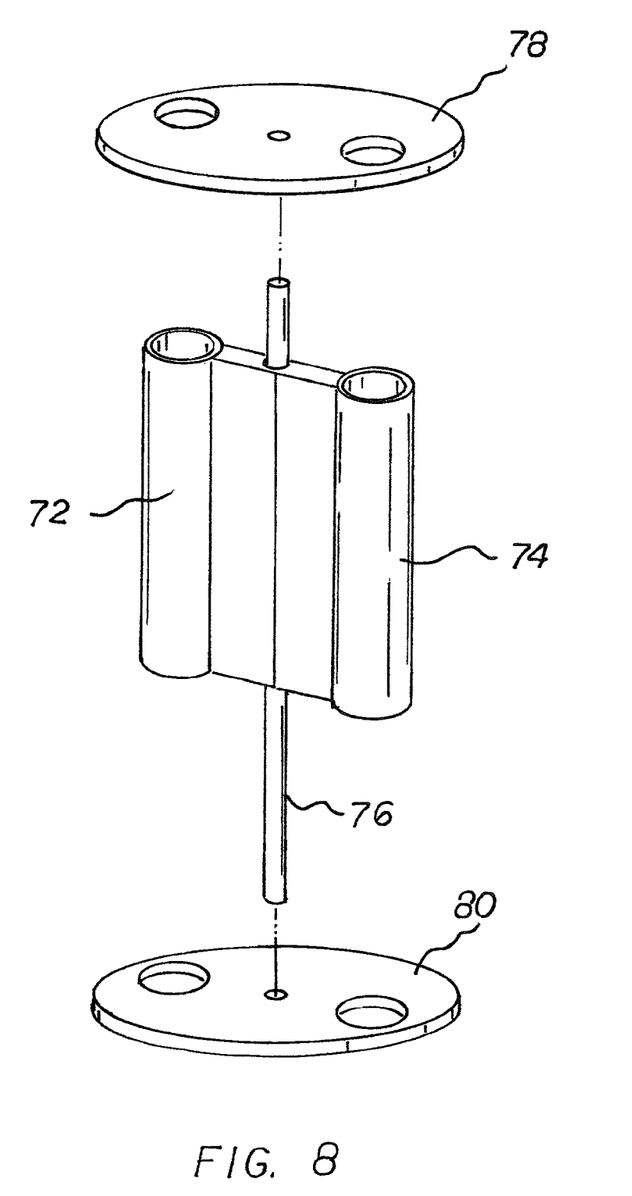
FIG. 8 is an exploded perspective illustrating the reciprocating assembly.

With reference now to the drawings, and in particular to FIG. 1 thereof, the preferred embodiment of the new and improved airlock feeder system embodying the principles and concepts of the present invention and generally designated by the reference numeral 10 will be described.

The present invention, the airlock feeder system 10 is comprised of a plurality of components. Such components in their broadest context include an input assembly, an output assembly, reciprocating assembly, and a drive mechanism. Such components are individually configured and correlated with respect to each other so as to attain the desired objective.

First provided is an input assembly 14. The input assembly is adapted to receive a quantity of dry particulate flour material to be fed. Note is taken that the preferred embodiment of the invention is for feeding dry particulate flour material. It should be understood, however, that the invention is adapted for feeding a wide range of materials including dry particulate material such as, but not limited to, powder and granules and the like.

The input assembly is fixedly positioned. The input assembly includes a funnel 16. The funnel has a single input opening 18. The single input opening is provided above. The funnel has first and second laterally spaced outlet openings 20, 22. The outlet openings are provided below. The funnel may be formed of plural pieces. In this manner changes of size and configuration are allowed so as to accommodate different applications. The input assembly includes a circular top end plate 24. The top end plate is fixedly secured to the funnel. The top plate is formed with rotationally spaced first and second top plate feed apertures 26, 28. The top plate feed apertures are fixedly aligned with the output openings of the funnel. The first and second top plate feed apertures have vertical, rotationally spaced first and second axes. The top end plate has rotationally spaced first and second filter apertures 30, 32.

An output assembly 40 is provided. The output assembly is operatively coupled to and fixedly positioned beneath the input assembly. The output assembly is adapted to receive two flows of dry particulate flour material from the input assembly. The output assembly includes a bottom end plate 42. The bottom end plate is fixedly coupled with respect to the top end plate. The bottom end plate has rotationally spaced first and second bottom plate feed apertures 44, 46. The first and second bottom plate feed apertures have rotationally spaced first and second axes. The first and second axes of the first and second bottom feed apertures are offset from the first and second axes of the top plate feed apertures.

Arcuate pick up shoes 48, 50 are provided. The shoes depend from the first and second feed apertures of the top plate. Horizontal dual discharge tubes 52, 54 are provided. The dual discharge tubes are coupled to the pick up shoes. The dual discharge tubes each have an input end and an output end. A pressure source 56 is provided. The pressure source is provided at the input end. A mixer 58 is further provided. The mixer is provided at the output end.

Further provided is a reciprocating assembly 60. The reciprocating assembly is located between the input assembly and the output assembly. The reciprocating assembly includes a cylindrical housing 62. The cylindrical housing has a top housing plate 64. The cylindrical housing has a bottom housing plate 66. The cylindrical housing and the top and bottom housing plates are fixedly secured between the top end plate above and the bottom end plate below. The bottom housing plate has bottom housing plate apertures 68. The bottom housing plate apertures are aligned with the bottom end plate apertures. The top housing plate has top housing plate apertures 70. The top housing plate apertures are aligned with the top end plate apertures. The reciprocating assembly includes a first cylinder. The first cylinder has a first cylindrical chamber 72. The reciprocating assembly includes a second cylinder. The second cylinder has a second cylindrical chamber 74. The reciprocating assembly including a drive shaft 76. The drive shaft and the cylindrical chambers are vertically oriented and laterally spaced. The drive shaft is provided between the first and second cylindrical chambers. Circular end caps 78, 80 are provided. The end caps are attached to the cylindrical chambers. The end caps have end cap apertures 82. The end cap apertures aligned with the cylindrical chambers.

Provided last is a drive mechanism 86. The drive mechanism is adapted to rotate the drive shaft. In this manner the cylindrical chambers are reciprocated between a first orientation and a second orientation. In this first orientation, the first cylinder is filled while the second cylinder is being discharged. The drive mechanism is adapted to rotate the drive shaft. In this manner the cylindrical chambers are reciprocated to a second orientation. In the second orientation, the second cylinder is being filled while the first cylinder is being discharged. The first and second cylindrical chambers are adapted to move through an operative orientation with respect to the filter apertures when reciprocating between the first and second orientations.

Figure 9:
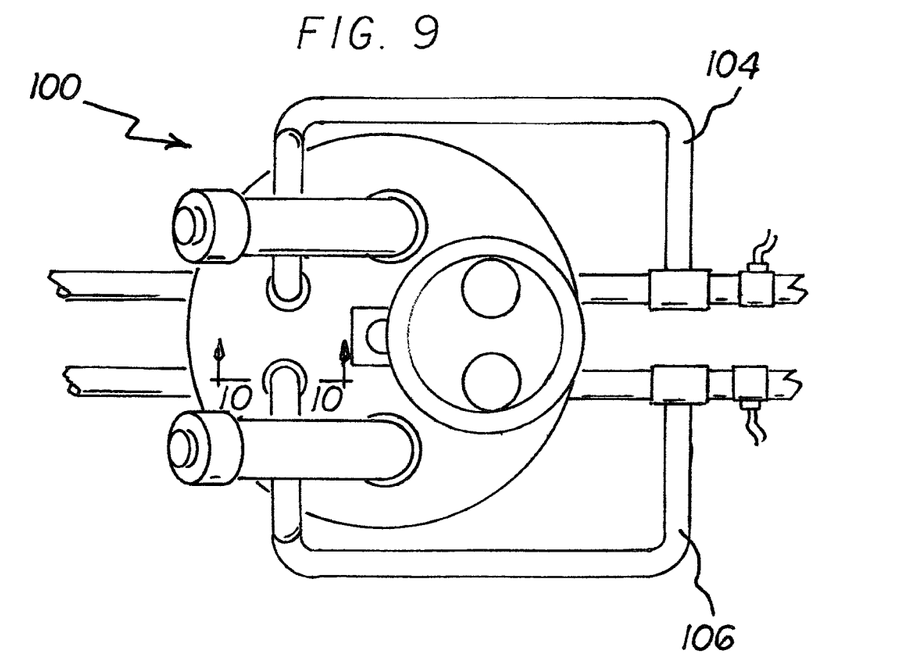
FIG. 9 is a plan view of a system constructed in accordance with an alternate embodiment of the invention.
Figure 10:
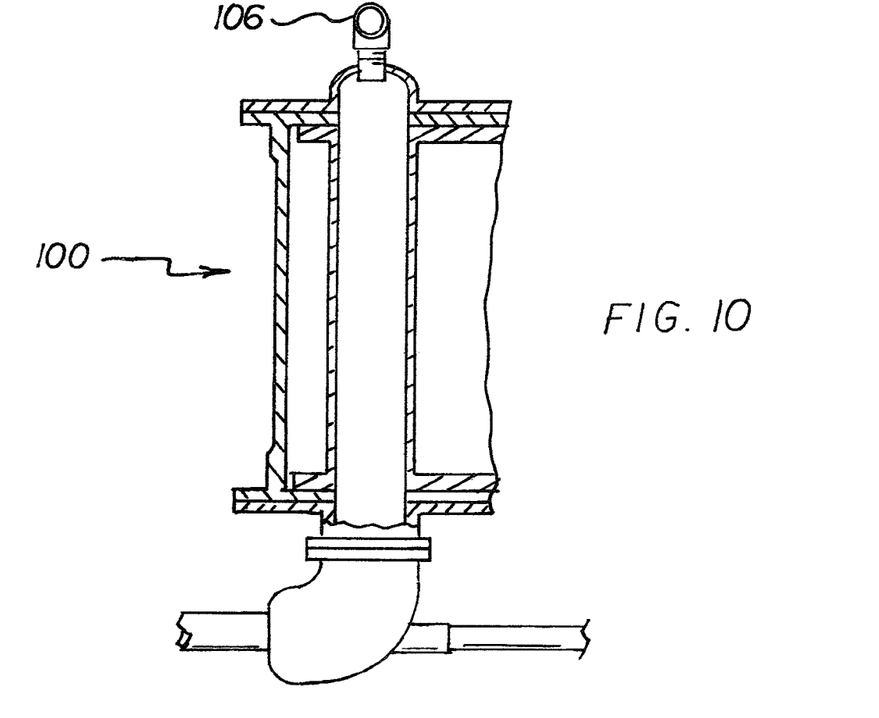
FIG. 10 is a cross sectional view taken along line 10-10 of FIG. 9.

Note the alternate embodiment 100 of the invention shown in FIGS. 9 and 10. In this embodiment, the circular top end plate has first and second pressure apertures. First and second supplemental pressure lines 104, 106 are provided. The supplemental pressure lines couple the first and second pressure apertures. The dual discharge tubes provide an increased pressure within the chambers as they pass between a fill orientation and discharge orientations.

The airlock feeder of the present invention can be used to replace existing single discharge horizontal shaft rotary valves in a conventional pneumatic conveying system. The unique dual discharge airlock design allows material to feed two pneumatic dry bulk conveying systems simultaneously. This airlock feeder eliminates the need for additional equipment required by traditional airlocks in applications calling for the delivery of material to multiple points. The advantage of reciprocating motion is that this unit can use an air actuator eliminating the need for an electric motor in a sometimes dusty electrically classified environment. In certain batch or weighing applications, because of the improved control of the rotor, this airlock can be used to accurately feed material volumetricly, eliminating the need for costly scales.

Often times in a modern bakery it is desirable to increase thru-put by delivering flour from a single storage silo to multiple mixers at the same time. With a typical single discharge airlock distributors of some kind are required to deliver the flour to two pneumatic systems. Not only does this additional equipment add cost to the project but it also requires additional stack-up height that in many instances is not available. This dual discharge airlock does not require the same additional equipment in order to deliver material to two destinations simultaneously, thereby allowing for easy retrofit of existing systems by eliminating the need to raise the silo's discharge height.

The airlock system of the present invention can be used to replace existing single discharge horizontal shaft rotary valves or be installed in a new pneumatic conveying application. This airlock system allows for material delivery to two outlets and enables a conventional pneumatic conveying system, dilute or dense phase, to transfer material to two destinations simultaneously.

Using cylindrical chambers that are open both on the top and bottom, the unit cycles back and forth from a center vertically positioned shaft moving the rotor from the fill cycle to the empty cycle. Two cylinders are employed in direct opposition of each other allowing for independent empty and fill cycles.

It is required to vent the chamber back to atmospheric pressure, ambient conditions, after the exposure to the elevated pressures of the conveying line so it can again fill with product. This is accomplished by positioning the chamber at a filtered relief port in the top plate just before it cycles back to the filling position.

The claimed invention differs from what currently exists, because all rotary type airlock valves that are in use today are limited to having only a single discharge. By moving the pivot point from a horizontal to a vertical position and filling the unit from the end plate, it is possible to provide two independent chambers working opposite of each other. The back and forth motion of the vertical shaft airlock lends itself to air actuators, eliminating the need for a rotating electrical motor. An additional benefit of this airlock is the improved consistent volumetric feeding over that of a conventional rotary feeder. The feeding tolerance in a conventional rotary airlock, lacking exact control of the motor/rotor position, is not acceptable in most applications. The reciprocating motion of the vertical shaft airlock of the present invention allows for accurate and calculated positioning of the rotor, as well as the counting of discharge cycles, greatly improving volumetric feeding tolerances.

This invention is an improvement on what currently exists, because almost all rotary valve airlocks that are in use today are limited to only a single discharge point. Because of increased production requirements many modern applications want to supply material from a single silo to mixers at two locations. In many applications it is difficult to retrofit the existing system with the equipment available today because of cost and downtime. This new airlock design allows for an easy retrofit and allows for the cost effective design of a new system with the flexibility to accurately meter feed non abrasive dry bulk materials such as flour or foundry bond to dual locations.

The version of the invention discussed here includes:
1. Top end plate with inlet opening,
2. Cylindrical,
3. Rotor with center shaft and two chambers,
4. Bottom end plate with outboard bearing and dual discharge openings,
5. Actuator with guard, and
6. (2) feed or pick-up shoes Relationship between the components:
1. The top end plate supports the shaft and bolts to silo's or hopper's discharge,
2. Housing required to support the top and bottom plate in place,
3. The dual chamber rotor is in contact with the dry bulk product and moves the ingredient from the fill position past the vent position to the discharge position and then returns to fill position,
4. The bottom plate provides the actual support of the rotor and actuator,
5. The air actuator moves the rotor from position to position, and
6. The feed or pick-up shoe transitions the airlock's discharge to the conveying system's pipe line.

In the present invention, the chambers of the rotor sequence back and forth from the fill to the discharge position. On the return cycle the chamber is vented to atmospheric pressures so that it can again be filled. An air actuator can be used to cycle the rotor on its shaft from the fill positions to the discharge positions. Electrical handshake with the pneumatic conveying system are required. Electrical interface are required to monitor and control the rotor positions.

Casting and machine work will be required on the end plates and rotor mating surfaces. A first step is to assemble a unit and fasten to a dry bulk storage container and then connect a low voltage electrical interface and compressed air supply for operation. All elements are necessary with upgraded electrical instrumentation to allow for more plant operator information. Elements cannot be shuffled or interchanged. A different actuator could be used with similar result. Slight modifications to the construction of this airlock feeder will allow the unit to be used to not only feed low pressure dilute phase pneumatic systems but also high pressure, over 15 PSIG) dense phase systems.

This airlock can be used to replace a typical horizontal shaft rotary airlock in the event that a plant increases capacity and adds additional destinations. Removal and installation by industrial trades is required.

The present invention is thus an airlock system with vertical shaft and dual outlet. This vertical shaft airlock does not require the same additional equipment in order to deliver material to two destinations simultaneously, allowing for easy retrofit of existing systems by eliminating the need to raise the silo discharge height. Air operators can be used in place of electric motors, eliminating the need for electrical supply in what many times is an environment containing explosive dusts. The airlock can be used to accurately volumetric feed material, because of the additional control of the rotor. This airlock can be used to feed non-abrasive material to both dilute and dense phase pneumatic conveying systems.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An airlock feeder system comprising:
  an input assembly adapted to receive a quantity of material to be fed, the input assembly including a single input opening above and first and second spaced outlet openings below;
  an output assembly operatively coupled to and fixedly positioned beneath the input assembly, the output assembly adapted to receive material from the input assembly for feeding through dual discharge tubes;
  a reciprocating assembly located between the input and output assemblies, the reciprocating assembly including first and second cylindrical chambers, a first circular end cap attached to the first cylindrical chamber with first end cap apertures aligned with the first cylindrical chamber, a second circular end cap attached to the second cylindrical chamber with second end cap apertures aligned with the second cylindrical chamber, the reciprocating assembly including a cylindrical housing with top and bottom housing plates, the cylindrical housing and the top and bottom housing plates being fixedly secured between the input assembly and the output assembly, the bottom housing plate having bottom housing plate apertures, the top housing plate having top housing plate apertures, a vertically oriented drive shaft within the cylindrical housing adapted to drive the first cylindrical chamber and the second cylindrical chamber between a fill orientation and a discharge orientation; and a drive mechanism adapted to reciprocate the first cylindrical chamber and the second cylindrical chamber between a first orientation where the first cylindrical chamber is being filled while the second cylindrical chamber is being discharged and a second orientation where the second cylindrical chamber is being filled while the first cylindrical chamber is being discharged.

2. The system as set forth in claim 1 and further including:
a circular top end plate fixedly secured to the outlet openings and formed with rotationally spaced first and second top plate feed apertures, the first and second top plate feed apertures having vertical, rotationally spaced first and second axes, the top end plate also formed with rotationally spaced first and second filter apertures.

3. The system (100) as set forth in claim 2 wherein the circular top end plate is formed with first and second pressure apertures and further including:
first and second supplemental pressure lines (104), (106) coupling the first and second pressure apertures with the dual discharge tubes for providing an increased pressure within the chambers as they pass between a fill orientation and a discharge orientation.

4. An airlock feeder system (10) for conveying dry particulate flour material from a single input position to two separate destinations simultaneously, the system comprising, in combination:
an input assembly (14) adapted to receive a quantity of dry particulate flour material to be fed, the input assembly being fixedly positioned and including a funnel (16) having a single input opening (18) above and first and second laterally spaced outlet openings (20), (22) below, the input assembly including a circular top end plate (24) fixedly secured to the funnel and formed with rotationally spaced first and second top plate feed apertures (26), (28) fixedly aligned with the output openings of the funnel, the first and second top plate feed apertures having vertical, rotationally spaced first and second axes, the top end plate formed with rotationally spaced first and second filter apertures (30), (32);

an output assembly (40) operatively coupled to and fixedly positioned beneath the input assembly, the output assembly adapted to receive two flows of dry particulate flour material from the input assembly, the output assembly including a bottom end plate (42) fixedly coupled with respect to the top end plate, the bottom end plate formed with rotationally spaced first and second bottom plate feed apertures (44), (46), the first and second bottom plate feed apertures having rotationally spaced first and second axes offset from the first and second axes of the top plate feed apertures;

arcuate pick up shoes (48), (50) depending from the first and second feed apertures of the top plate, horizontal dual discharge tubes (52), (54) coupled to the pick up shoes, the dual discharge tubes each having an input end and an output end with a pressure source (56) at the input end and a mixer (58) at the output end;

a reciprocating assembly (60) located between the input assembly and the output assembly, the reciprocating assembly including a cylindrical housing (62) with a top housing plate (64) and a bottom housing plate (66), the cylindrical housing and the top and bottom housing plates being fixedly secured between the top end plate above and the bottom end plate below, the bottom housing plate having bottom housing plate apertures (68) aligned with the bottom end plate apertures, the top housing plate having top housing plate apertures (70) aligned with the top end plate apertures, the reciprocating assembly including a first cylinder with a first cylindrical chamber (72) and a second cylinder with a second cylindrical chamber (74), the reciprocating assembly including a drive shaft (76), the drive shaft and the cylindrical chambers being vertically oriented and laterally space with the drive shaft (76) between the first and second cylindrical chambers, circular end caps (78), (80) attached to the cylindrical chambers with end cap apertures (82) aligned with the cylindrical chambers; and a drive mechanism (86) adapted to rotate the drive shaft to reciprocate the cylindrical chambers to a first orientation where the first cylinder is being filled while the second cylinder is being discharged, the drive mechanism adapted to rotate the drive shaft to reciprocate the cylindrical chambers to a second orientation where the second cylinder is being filled while the first cylinder is being discharged, the first and second cylindrical chambers adapted to move through an operative orientation with respect to the filter apertures when reciprocating between the first and second orientations.

\* \* \* \* \*